United States Patent
Barnoski et al.

[11] 4,054,366
[45] Oct. 18, 1977

[54] FIBER OPTICS ACCESS COUPLER

[75] Inventors: Michael K. Barnoski, Pacific Palisades; Howard R. Friedrich, Woodland Hills; Robert J. Morrison, Canoga Park, all of Calif.

[73] Assignee: Hughes Aircraft Company, Culver City, Calif.

[21] Appl. No.: 704,274

[22] Filed: July 12, 1976

[51] Int. Cl.² ............................................. G02B 5/14
[52] U.S. Cl. ................................................. 350/96 C
[58] Field of Search .......................... 350/96 C, 96 WG

[56] References Cited

U.S. PATENT DOCUMENTS

| | | | |
|---|---|---|---|
| 3,558,213 | 1/1971 | Marcatili | 350/96 WG |
| 3,902,786 | 9/1975 | Brown | 350/96 C |
| 3,933,410 | 1/1976 | Milton | 350/96 C |
| 4,021,097 | 5/1977 | McMahon | 350/96 C |

*Primary Examiner*—John K. Corbin
*Assistant Examiner*—Stewart Levy
*Attorney, Agent, or Firm*—Donald C. Keaveney; W. H. MacAllister

[57] ABSTRACT

There is disclosed a fiber optic coupler for use in single strand fiber systems comprising a device to allow optical access to a single fiber by means of a second fiber which has been attached to it by fusing the glass cladding of the two fibers as by application of heat by a laser. The resulting access coupler provides for coupling both into and out of a single strand of fiber optic waveguide. That is to say, an input optical signal to one single fiber strand can be read out at more than one point on the single fiber or more than one input can be read out at a single point. The coupler is sufficiently low loss to make control systems utilizing single fiber lines rather than bundles a realistic possibility.

6 Claims, 9 Drawing Figures

FIBER OPTICS ACCESS COUPLER

BACKGROUND OF THE INVENTION

The achievement of low-loss (less than 2 dB/km) transmission has made the optical fiber waveguide the leading contender as the transmission medium for a variety of future systems ranging in length from several meters to kilometers. This new low-loss medium offers the potential of many significant advantages compared with metallic conductors, including: long distance transmission without repeaters, immunity from electromagnetic interference, cross-talk and ground loop, high bandwidth capabilities, small size and weight, high degree of intercept security and dielectric isolation, and long term cost reduction. The foregoing desirable features of optical fiber waveguides have strongly stimulated efforts in the supporting technologies such as fiber preparation and cabling, long life solid state sources and high performance receivers. As a result of the considerable progress in these areas, the utilization of optical fibers in military systems appears imminent.

There are currently strong trends in military system design, particularly shipboard and airborne, toward micro-miniaturization, digital processing, and system level integration in order to achieve smaller size, weight, and power consumption along with lower cost and improved reliability. Since these trends naturally point to data bus multiplexing it is imperative that consideration be given to fiber optic data distribution systems. There are currently two fiber optic configurations being considered for the distribution of data to a set of remote terminals. One is a serial distribution system that employs T access couplers, and the other is a parallel system employing a Star coupler. To date, both of these systems have been demonstrated using fiber optic bundles rather than single optical fibers. The compelling reason for the use of bundles to this point is that couplers for both T and Star single strand systems have not been developed. Both 1 dB insertion loss cable connectors and 7 dB insertion loss star couplers suitable for bundle systems have, however, been reported in the open literature. See, for example, an article by Frank L. Thiel, Roy E. Love, and Rex L. Smith in the "Journal of Applied Optics", Volume 13, page 240 (1974). See also an article by M. C. Hudson and F. L. Thiel, "Journal of Applied Optics", Volume 13, page 2540 (1974). Bi-directional access couplers with a 1 dB insertion loss, however, have not heretofore been reported.

It can be shown that generally the signal level advantage of the Star format over the serial format increases as the number of terminals in the system increases. The advantage is more pronounced the higher the insertion loss of both the cable connectors and the access couplers. It is, however, relatively insensitive to the insertion loss of the Star coupler. This fact affects the practicality of a serial distribution system assembled with fiber bundles rather than with a single fiber, since in this case the insertion losses of both the cable connectors and access couplers must include the packing fraction loss of the bundled fibers which at best is on the order of 1 dB. However, since systems which employ single fibers as a communication channel do not suffer from the packing fraction problem, both the cable connectors and the access couplers can, in principle, be fabricated with extremely low insertion losses. Give such low-loss connectors and couplers, it can be shown that the serial distribution format for a single strand fiber system can be assembled to serve a modest number of remote terminals without consuming an unreasonable portion of the available power budget from normally used sending and receiving equipments. It can also be shown that for a modest number of terminals, say 20 or less, the power budget advantage of the star system is not excessively large. The cost of the single fiber serial system, where it can meet systems requirements, is obviously less than that of either of the bundled type systems or of a single fiber star system since the amount of optical waveguide cable being used is significantly less.

Such a system depends, however, upon the availability of a low-loss direct access coupler to a single fiber which has not heretofore been available. An indirect access coupler for selective mode coupling has been disclosed in the copending patent application of Michael K. Barnoski and Viktor Evtuhov entitled, "Angle Selective Coupler for Optical Fiber", filed Aug. 4, 1975 as Ser. No. 601,863 and assigned to the same assignee as is the present application. Such an indirect coupler, however, is not intended for use in systems of the type considered above, which require a direct access coupler.

SUMMARY OF THE INVENTION

Optical fiber in which the present invention is intended for use is a glass fiber waveguide for the transmission of optical electromagnetic radiation which may be in either the infrared, visible, or ultraviolet wavelength region. The waveguide consists essentially of a glass core member having an index of refraction with a maximum value of at least 0.1 of a percent greater than the index of refraction of a glass cladding layer which concentrically surrounds the core. The core material may be either uniform in its index of refraction or may be graded to smoothly become equal to that of the cladding. In either event, waveguiding action of an optical signal supplied to the core is achieved by internal reflection of the optical radiation at the core-clad interface. Each fiber is extremely small in total diameter in order to maintain flexibility of the glass. In practice the core diameter is in the range of 30 to 100 micrometers whereas a preferred range of thickness of glass cladding is in the range of 12 to 100 micrometers. Most of the optical energy is transmitted through the core, but a fraction of the power is transmitted in the cladding.

The coupling device of the present invention provides a partial transfer of optical energy from one fiber into another. It is made by fusing the cladding materials of the two adjacently positioned fibers together by brief application of energy from a laser such as a $CO_2$ laser. The amount of coupling between the two fibers depends on the distance between the cores of the two fibers and on the length over which this distance between the cores is maintained. It also depends on the angle that fibers make at the junction between them and on the modes that have been excited in the waveguide. These coupling determining factors can be controlled by controlling the shape of the laser beam, its size and power and/or the exposure time and by by the use of an appropriate holding fixture during the fusing of the coupler.

BRIEF DESCRIPTION OF THE DRAWINGS

These and other features, advantages and objects will be more fully apparent from the detailed description below taken in connection with the accompanying drawing in which:

FIG. 2b is a reproduction of a photograph obtained from the device as illustrated in FIG. 2a.

DETAILED DESCRIPTION OF THE INVENTION

A very thorough and complete discussion concerning the operational theories of optical waveguides is contained in U.S. Pat. No. 3,157,726 issued to Hicks, et al and in the publication "Cylindrical Dielectric Waveguide Mode" by E. Snitzer appearing in the "Journal of the Optical Society of America", vol. 51, number 5, pages 481–498, May 1961. Another excellent source of information concerning optical waveguides is the book entitled, "Fiber Optics-Principles and Applications" by N. S. Kapany, Academic Press, 1967. In general the term "optical waveguide" will be used herein to refer to a glass transmission line having a core member with a cladding member concentrically surrounding the core for transmitting by internal reflection at the core-clad interface electromagnetic radiation which lies in the optical portion of the electromagnetic spectrum between microwaves and x-rays and including the ultraviolet, visible and infrared regions.

Figure 1:
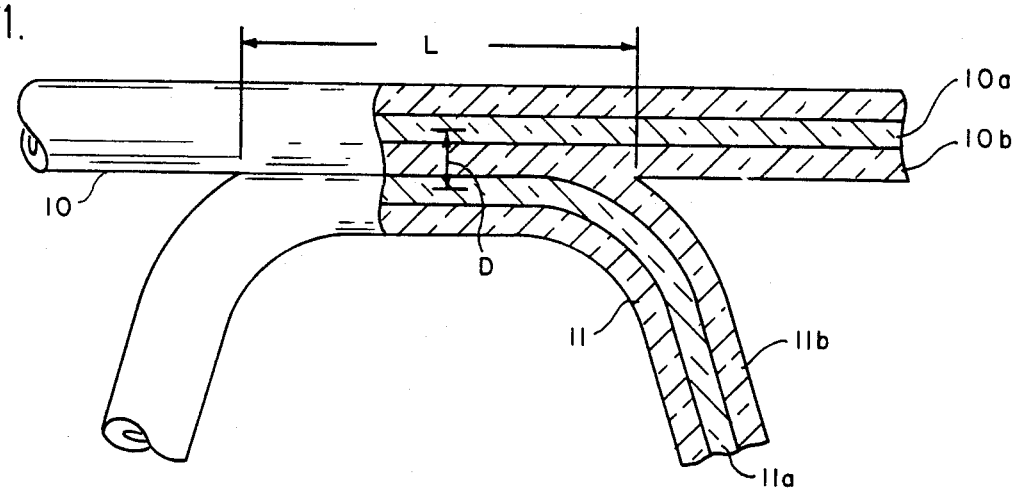
FIG. 1 is a pictorial representation of a single strand access coupler.

There is shown in FIG. 1 a pictorial representation of two low-loss single fiber optical waveguides, 10 and 11, which were separately obtained from the Corning Glass Works of Corning, New York and were fused as described below to form the coupling device shown pictorially in FIG. 1 and schematically in FIG. 2a. The optical waveguide 10 consists of a glass core 10a which is concentrically surrounded by a glass cladding 10b. Similarly, the optical waveguide 11 consists of a core 11a which is concentrically surrounded by a cladding 11b. The index of refraction of each of the core materials is greater than the index of refraction of the cladding material so that internal reflection occurs at the core-clad boundary. The optical waveguides 10 and 11 are shown without any protective jacket material. If such a protective jacket is to be used it is of course removed in that area of the waveguide to be used for the coupling device before the access coupler is fabricated.

The completed single fiber optical waveguide access coupler is shown pictorially in FIG. 1 and is achieved by frustrating the total internal reflection at the core-clad interface of that waveguide which originally contained the signal by bringing the two cores of the optical waveguides sufficiently close together for a selected interaction length, L, to result in coupling. As a result, the guided optical modes in one fiber will mix with those in the other. Since the fiber waveguides are highly multi-mode, the coupling occurs between groups of modes.

The device shown in FIG. 1 can conveniently be fabricated by placing the two separate single fiber optical waveguides 10 and 11 in any suitable holding fixture so that their outer surfaces are in contact throughout the interaction length L. The entire interaction length is then subjected to a brief burst of energy from a laser such as a two watt carbon dioxide laser. The laser energy melts the outer glass cladding material and fuses the waveguides together thereby forming the access coupler shown in FIG. 1. The localized heat source afforded by the laser beam which is focussed on the cladding only helps circumvent problems encountered with extended heat source, when the core glass has a lower melting point than the clad as was the case here.

This type of access coupler circumvents the problem of severe mechanical alignment tolerances which occur in access coupler designs employing conventional optical components such as lenses, mirrors and beam splitters.

Figure 2A:
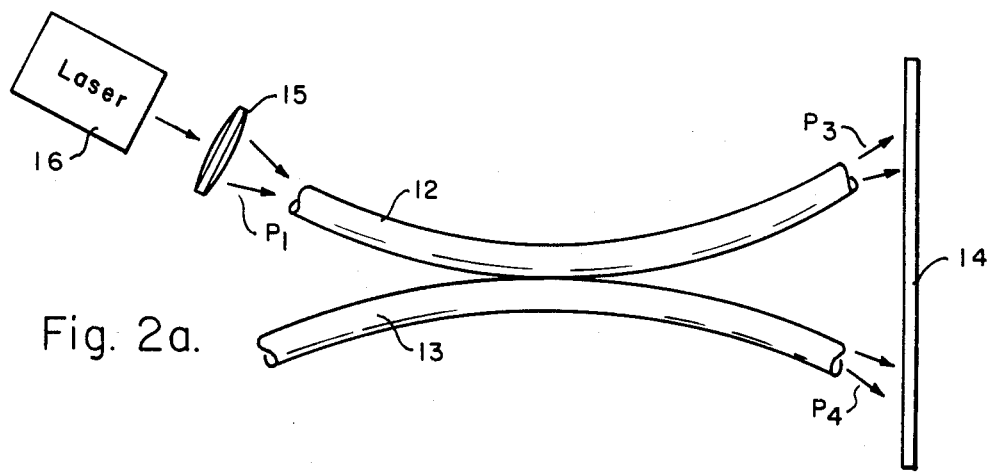
FIG. 2a is a schematic illustration of the manner in which a coupler in accordance with the showing of FIG. 1 was arranged to test its transmission qualities.
Figure 2B:
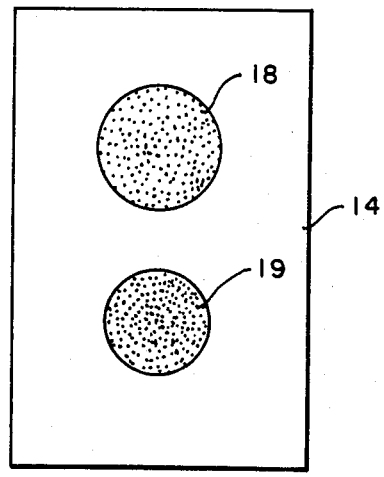

A schematic representation illustrating an arrangement with which the experimental results of FIG. 2b were obtained is shown in FIG. 2a. An access coupler was formed by using two sections of fiber 12 and 13, held adjacent to each other and fused by application of a laser beam. The interaction length in this arrangement was 750 micrometers. The end of fiber 12 was excited by the output from a helium-neon laser 16 applied to it through a lens 15, as shown in FIG. 2a. The opposite ends of both fibers 12 and 13 were directed at a photographic color film 14. When radiation of power $P_1$ from laser 16 was applied to only the input end of fiber 12, electromagnetic radiation output was observed to emanate from both fibers 12 and 13 and formed the exposure spots 18 and 19 on the film 14 thus indicating that coupling had been achieved. The outputs from fibers 12 and 13 are respectively denoted as $P_3$ and $P_4$. (For the particular coupler used in the experiment, the ratio ($P_4/P_3$) of power emitted from the access channel fiber 13 to that from the main channel fiber 12 was 8 percent.) This result indicates that single strand access couplers can be fabricated by coupling two multi-mode optical waveguides together.

As noted above, the degree or amount of coupling between the two fibers depends on the distance, D, between the cores of the two fibers and on the length, L, over which this distance between the cores is maintained. Generally speaking, the closer the core axes are to each other the greater will be the coupling and the longer the interaction length the greater will be the coupling.

Figure 3:
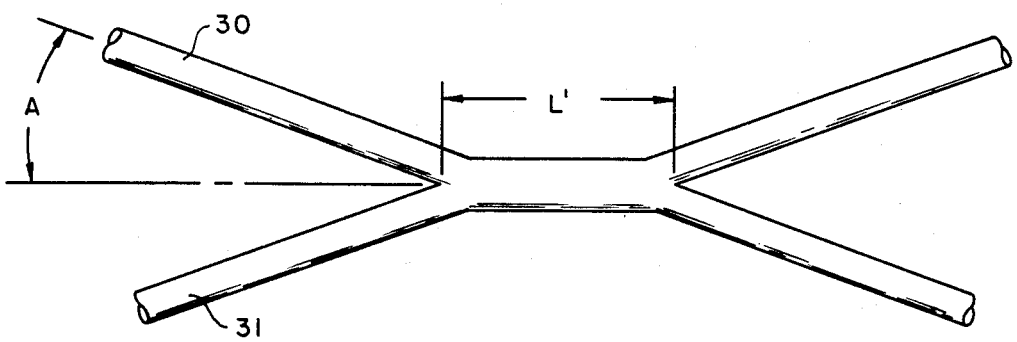
FIGS. 3, 4 and 5 respectively are diagrammatic illustrations of alternate configurations of the coupler.
Figure 4:
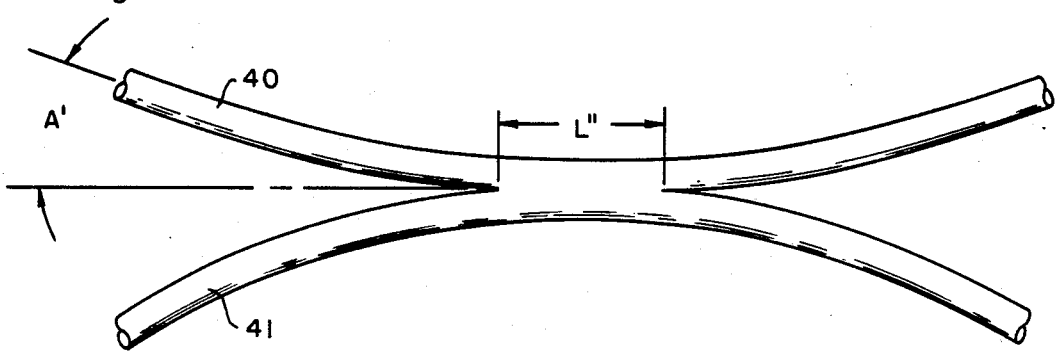
Figure 5:
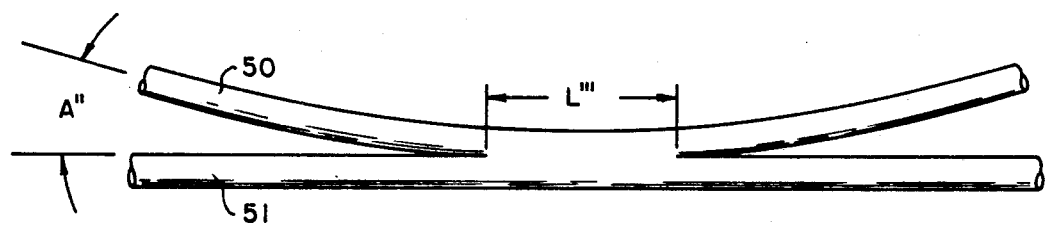

In FIGS. 3, 4 and 5 there are illustrated alternative possible configurations for access couplers illustrating another parameter controlling the coupling, namely, the angle between the axial direction of the core of the first fiber at the entrance end of the fused length L and the common axial direction of the cores in the fused length. Generally speaking, the greater the angle, the greater degree of coupling within the numerical aperture of the fiber. Thus, in FIGS. 3, 4 and 5 it can be seen that the angle A at this junction is greater than the angle A' which in turn is greater than the angle A''. Consequently, the degree of coupling will be greater in FIG. 3 than in FIG. 4 and will be greater in FIG. 4 than in FIG. 5 for a constant interaction length L. The degree of coupling for any given angle also depends on the modes excited in the main fiber. The higher modes couple more energy into the access fiber since they make a greater propagation angle with respect to the access coupler.

The degree of coupling in the experimental arrangement shown in FIG. 2a was found to be 8 percent where this degree of coupling is expressed as the ratio of the power output $P_4$ from the access fiber 13 to the power output $P_3$ from the main fiber 12. This access coupler was formed from optical waveguides having outer diameters of 125 micrometers and core diameters of 80 micrometers. Each was a standard Corning low-loss glass fiber. The interaction length, as noted above was 750 micrometers. In general interaction lengths from hundreds of micrometers to as much as 1 centimeter are practical. The indices of refraction of the materials used in FIG. 2a were 1.48 for the core materials and 1.47 for the cladding materials. The measured numerical aperture was 0.14.

In another coupler having an interaction length of 13 millimeters, each fiber was a 125 micrometer o.d. Corning low-loss step index fiber with core diameters of 85 micrometers and a 0.14 numerical aperture.

Quantitative insertion loss and tap ratio measurements were made on this device by exciting the main channel fiber with a 50-$\mu$m diameter surface emitting LED. Cladding modes were stripped on all ports using gycerol-soaked velvet pads. The tap ratio for a coupler fused together over an interaction length of 13 mm was measured to be $$C_{14} = (P_4/P_1) = 6.6\% \ (-11.8 \text{ dB}).$$

Where $P_1$ is the power input to fiber 12, $P_3$ is the power output from fiber 12, and $P_4$ is the power output from fiber 13. The excess insertion loss defined as $$10 \log (P_4 + P_3/P_1)$$

ps was measured to be $-1.1$ dB for this particular coupler.

The results of these experiments indicate that it is possible to form efficient access couplers by using a $CO_2$ laser to weld together two "off-the-shelf" multimode fibers. By properly controlling the welding process, couplers with varying degrees of tap ratio and modal selectivity can be fabricated.

Figure 6:
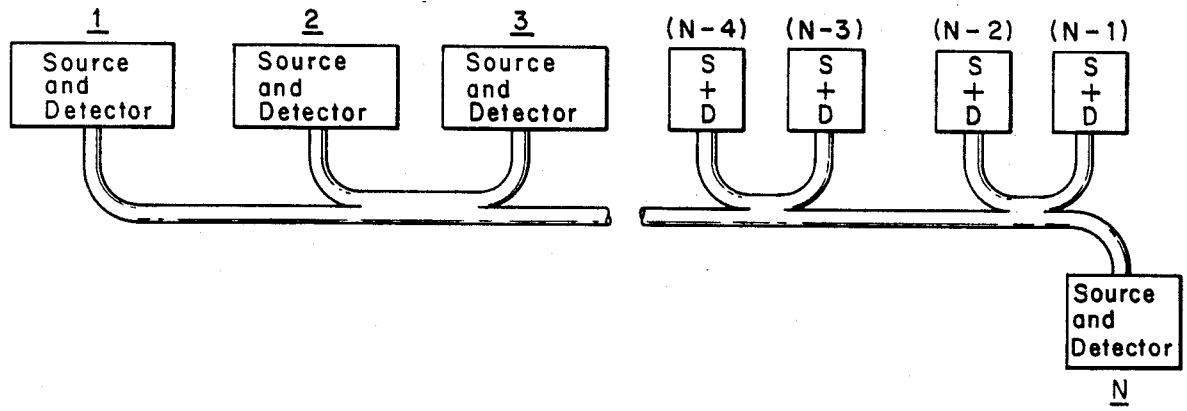
FIG. 6 is a schematic diagram of an N-terminal serial distribution system with access couplers in accordance with the present invention.
Figure 7:
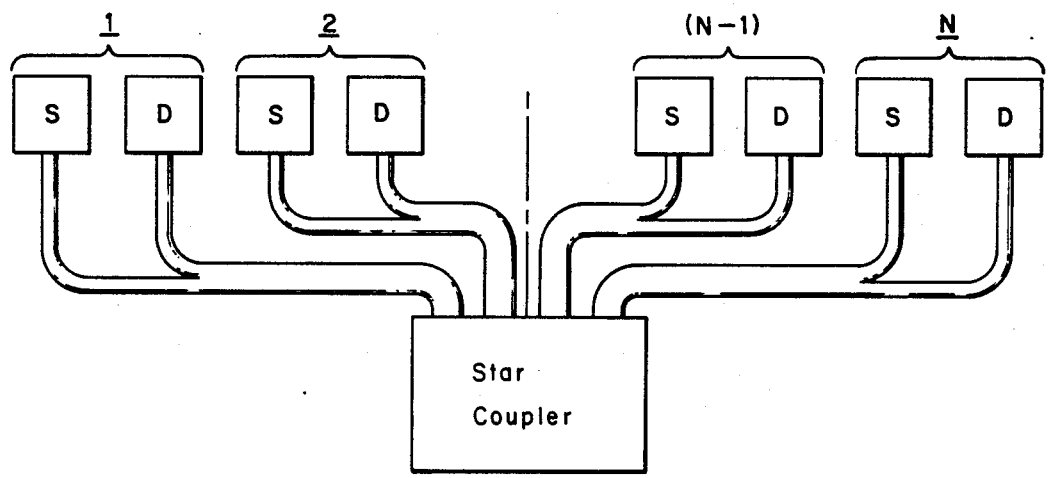
FIG. 7 is a schematic diagram of an N-terminal parallel distribution system with star coupler.

As has been noted above and is more fully set forth in an article by M. K. Barnoski in "Applied Optics", Vol. 14, page 2571, (1975), there are currently two fiber optic configurations being considered for the distribution of data to a set of remote terminals. One is a serial distribution system of the type shown in FIG. 6 which employs T access couplers which can advantageously be of the type disclosed herein. The other system which affords an alternative is a parallel system of the type shown in FIG. 7 which employs a star coupler of a type well known in the art to effectively eliminate the need for T access couplers. The serial distribution system shown in FIG. 6 indicates an N-terminal system and the parallel system shown in FIG. 7 is similarly for an N-terminal system. A comparison of system performance of these two formats can be made by comparing the terminal to terminal loss introduced between pairs of remotely spaced terminals by the distribution network itself.

For the serial system with access couplers with a constant tap ratio the lowest ratio of optical power in the transmission line at the input to one terminal to the optical power at the output to another occurs between terminals 1 and $N - 1$ in an N-terminal system. If the fiber attenuation losses are not included the ratio is:

$$(P_{N-1}/P_1) = (2L_C + L_{CI} + L_{IT}) (N - 3)$$
$$+ (2L_C + L_{CI} + L_T) + L_S$$

where
$L_{CI}$ = internal insertion loss of the access coupler;
$L_C$ = insertion loss of the cable couplers attached to the access coupler at each of the three ports;
$L_S$ = splitting factor of the duplex input-output coupler necessary for bi-directional operation; this always has the value $-3$ dB;
$L_T$ = tap ratio of the access coupler;
$L_{IT}$ = insertion loss associated with power tapped by the coupler.

The above ratio assumes that the access coupler is symmetric, that is, the insertion loss is constant independent of which pair of access coupler parts are being considered. On the other hand, the corresponding ratio of optical powers in a parallel system employing a star coupler is independent of which pair (jk) of system terminals is being considered and is given by $$P_j/P_k = 4 L_C + L_{CI} + L_T + L_S,$$

where
$L_C$ = the insertion loss associated with the cable connectors;
$L_{CI}$ = insertion loss of the Star coupler;
$L_S$ = splitting factor of bi-directional input-output connector; and
$L_T$ = 10 log (1/N) is the tap ratio or splitting factor of the Star coupler.

Figure 8:
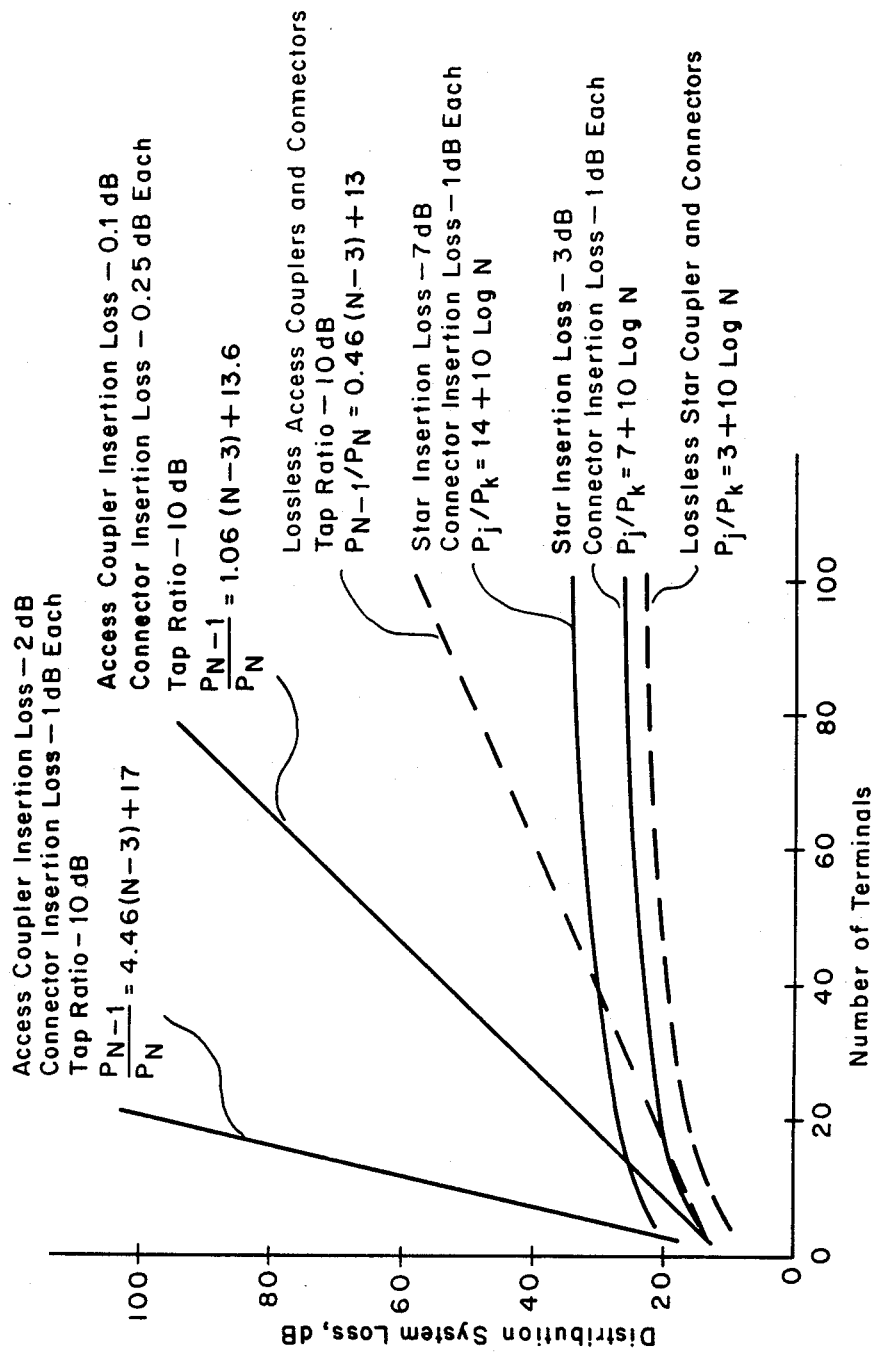
FIG. 8 is a graph showing distribution system loss plotter as a function of the number of terminals for various sets of coupler losses.

Plots of these distribution system losses for both the serial and parallel systems as a function of the number of terminals are shown in FIG. 8. Several separate sets of parameters were used for each format. The numerical values used in one case are a cable connector insertion loss of 1 dB for both the parallel and serial system, an access coupler insertion loss of 2 dB with a constant 10-dB tap ratio, a Star coupler insertion loss of 7 dB, and since the system is assumed bi-directional, a 3-dB splitting factor. These coupling losses are appropriate for systems wired with bundles of multimode fibers. Both 1 dB insertion loss cable connectors and a 7 dB insertion loss Star coupler have been reported in the open literature as noted above. But bi-directional access couplers with 1 dB insertion loss, such as can be achieved by the direct access coupler described herein, have not, heretofore been reported. The second set of numerical values used are a cable connector insertion loss of 0.25 dB, an access coupler insertion loss of 0.1 dB with a constant 10 dB tap ratio, a Star coupler insertion loss of 3 dB, and again a 3 dB splitting factor. These values are more appropriate for systems wired with single fibers serving as the communication channel. Also shown in FIG. 8 are the curves for both the parallel and serial systems which result if all the couplers are assumed loss-free. The distribution system losses in this idealized case result only from splitting the power up among the various terminals.

The comparison of the serial and parallel networks using fiber bundles, as done in FIG. 8, illustrates several features important in system design. The plots clearly reveal the signal level advantage of the star format over the serial format as the number of terminals in the system increases. The advantage is more pronounced the higher the insertion loss of both the cable connectors and the access couplers. It is, however, relatively insensitive to the insertion loss of the star coupler. This fact affects the practicality of a serial distribution system assembled with fiber bundles since in this case the insertion losses of both the cable connectors and access couplers must include the packing fraction loss of the bundled fibers which at best is on the order of 1 dB.

However, systems which employ single fibers as a communication channel do not suffer from the packing fraction problem and both the cable connectors and access couplers can, in principle, be fabricated with extremely low insertion losses. Given such low-loss connectors and couplers the plots shown in FIG. 8 illustrate that the serial distribution format for single strand fiber systems can be assembled to serve a modest number of remote terminals without consuming an unreasonable portion of the available power budget. The plots also illustrate that for a modest number of terminals, say 20 or less, the power budget advantage of the Star system is not excessively large. Hence, if there are other system considerations which point toward use of the serial format, such a system using single fibers as a communication channel could serve a modest number of terminals without requiring a high sensitivity receiver with a large dynamic range.

Although the bundled waveguides have served quite well for feasibility demonstrations, they are in no sense suitable for eventual practical military or commercial field environments. Recently, however, there have become available low-loss optical fiber cables suitable for use in field environments. The cabled structures contain tensile strength members and are also designed to provide crush resistance. Since the glass fibers are protected against breakage due to both tension and crush, there is no longer a need for a large number of fiber strands bundled together to provide adequate redundancy. Therefore, these cables, which contain a few glass fiber waveguides, make it feasible to design both parallel and serial distribution systems using single glass strands as a communication channel in conjunction with access couplers of the type shown in FIG. 1. Such systems are shown in FIGS. 6 and 7.

As mentioned above, since the packing fraction loss is not a factor in systems employing single strands of fiber as a communication channel, it is possible to utilize serial distribution provided that adequate techniques for coupling to single fibers together are developed. The coupler disclosed herein affords such a technique and makes the sometimes more desirable single strand serial mode system of FIG. 6 a practical choice for field environments, thus eliminating the cost and weight of the Star coupler and the cost and weight of excess waveguide.

What is claimed is:

1. A fiber optic single fiber direct access coupler comprising:
   a. first and second single fiber optical waveguides each of said waveguides comprising a core of material having an index of refraction $n_1$ and a cladding material surrounding said core, said cladding material having an index of refraction $n_2$ which is less than $n_1$ such that a major portion of optical energy propagated through said core of either of said waveguides in one or more predetermined optical modes of propagation is internally reflected at the interface between said core and said cladding and is thereby waveguided through said core; and
   b. means for forming a unitary coupling section for coupling a minor portion of said optical energy from said first waveguide to said second waveguide, said means comprising a portion of said cladding of said first fiber which is fused with a portion of said cladding of said second fiber to maintain in said fused portions a predetermined spatial relationship between said cores of said first and second fibers along a predetermined axial length of said core of said first fiber; the degree of coupling of optical energy from said first core to said second core being dependent on said predetermined spatial relationship between said cores, on the magnitude of said predetermined fused length, on the angle between the axial direction of said first core at the entrance end of said fused length and the common axial direction of said cores in said fused length and on said optical propagation modes in said first core.

2. A device as in claim 1 wherein the axial length of said unitary coupling section is between 100 micrometers and 1 centimeter.

3. A device as in claim 1 wherein each of said fiber optical waveguides has an outer diameter which is less than 250 micrometers.

4. In a glass transmission line for the transmission of electromagnetic radiation within the optical wavelength of from 0.03 to 300 micrometers, said line consisting essentially of a core member having a first refractive index for said wave energy and a cladding about said core, said cladding including at least one layer having a second refractive index for said wave energy which is at least 0.1 percent lower than the maximum value of said first refractive index of said core, said transmission line wave-guiding said optical energy by internal reflection at said core-clad interface, the improvement comprising:
   a. a plurality of low-loss single fiber direct access couplers connected in optical series circuit relationship along said transmission line, each of said couplers providing for optical signal input and/or output to and/or from said line and each of said couplers comprising:
   b. first and second single fiber optical waveguides each of said waveguides comprising a core of material having an index of refraction $n_1$ and a cladding material surrounding said core, said cladding material having an index of refraction $n_2$ which is less than $n_1$ such that a major portion of optical energy propagated through said core of either of said waveguides in one or more predetermined optical modes of propagation is internally reflected at the interface between said cladding and is thereby waveguided through said core;
   c. said first single fiber optical waveguide of each of said access couplers being a portion of said glass transmission line; and
   d. means for forming a unitary coupling section for coupling a minor portion of said optical energy from said first waveguide transmission line to said second waveguide, said means comprising a portion of said cladding of said first fiber which is fused with a portion of said cladding of said second fiber to maintain in said fused portions a predetermined spatial relationship between said cores of said first and second fibers along a predetermined axial length of said core of said first fiber; the degree of coupling of optical energy from said first core to said second core being dependent on said predetermined spatial relationship between said cores, on the magnitude of said predetermined fused length, on the angle between the axial direction of said first core at the entrance end of said fused length and on the common axial direction of said cores in said fused length, and on said optical propagation modes in said first core.

5. A device as in claim 4 wherein the axial length of each of said unitary coupling sections is between 100 micrometers and 1 centimeter.

6. A device as in claim 4 wherein each of said fiber optical waveguides has an outer diameter which is less 250 micrometers.

* * * * *